United States Patent [19]
Keller

[11] Patent Number: 6,167,180
[45] Date of Patent: Dec. 26, 2000

[54] CABLE HAVING AT LEAST ONE LAYER OF FLEXIBLE STRENGTH MEMBERS WITH ADHESIVE AND NON-ADHESIVE YARNS FOR COUPLING AN OUTER PROTECTIVE JACKET AND A BUFFER TUBE CONTAINING OPTICAL FIBERS

[75] Inventor: David A. Keller, Apex, N.C.

[73] Assignee: Alcatel, Paris, France

[21] Appl. No.: 09/151,543

[22] Filed: Sep. 11, 1998

Related U.S. Application Data

[60] Provisional application No. 60/058,751, Sep. 12, 1997, and provisional application No. 60/066,676, Nov. 13, 1997.

[51] Int. Cl.[7] .................................................... G02B 6/44
[52] U.S. Cl. .......................... 385/113; 100/104; 100/106
[58] Field of Search ..................................... 385/100–114

[56] References Cited

U.S. PATENT DOCUMENTS

| | | | |
|---|---|---|---|
| 4,324,453 | 4/1982 | Patel | 385/100 |
| 4,351,913 | 9/1982 | Patel | 523/218 |
| 4,497,538 | 2/1985 | Patel | 385/109 |
| 4,550,976 | 11/1985 | Cooper et al. | 385/103 |
| 4,695,128 | 9/1987 | Zimmerman et al. | 385/111 |
| 4,743,085 | 5/1988 | Jenkins et al. | 385/113 |
| 4,765,711 | 8/1988 | Obst | 385/103 |
| 4,828,352 | 5/1989 | Kraft | 385/109 |
| 4,850,672 | 7/1989 | Zimmermann | 385/111 |
| 4,881,795 | 11/1989 | Cooper | 385/104 |
| 4,892,382 | 1/1990 | Story et al. | 385/102 |
| 4,895,427 | 1/1990 | Kraft | 385/109 |
| 4,898,451 | 2/1990 | Story | 385/106 |
| 4,921,413 | 5/1990 | Blew | 425/293 |
| 4,939,896 | 7/1990 | Blew | 57/71 |
| 4,983,333 | 1/1991 | Blew | 264/1.25 |
| 5,013,127 | 5/1991 | Bernard | 385/107 |
| 5,022,344 | 6/1991 | Kundis | 118/56 |
| 5,039,197 | 8/1991 | Rawlyk | 385/102 |
| 5,050,957 | 9/1991 | Hamilton et al. | 385/113 |
| 5,067,830 | 11/1991 | McAlpine et al. | 385/114 |
| 5,157,752 | 10/1992 | Greveling et al. | 385/112 |
| 5,166,998 | 11/1992 | Patel | 385/114 |
| 5,188,883 | 2/1993 | Rawlyk | 428/189 |
| 5,189,718 | 2/1993 | Barrett et al. | 385/101 |
| 5,212,756 | 5/1993 | Eoll | 385/114 |
| 5,224,192 | 6/1993 | Wagman | 385/112 |
| 5,249,249 | 9/1993 | Eoll et al. | 385/114 |
| 5,293,443 | 3/1994 | Eoll et al. | 385/114 |
| 5,295,215 | 3/1994 | Fedoroff et al. | 385/109 |
| 5,312,499 | 5/1994 | Bolick et al. | 156/48 |
| 5,343,549 | 8/1994 | Navé et al. | 385/103 |
| 5,347,607 | 9/1994 | Abernethy | 385/102 |
| 5,348,586 | 9/1994 | Temple, Jr. et al. | 118/405 |
| 5,371,823 | 12/1994 | Barrett et al. | 385/101 |
| 5,371,824 | 12/1994 | Parris et al. | 385/109 |
| 5,388,175 | 2/1995 | Clarke | 385/100 |
| 5,408,561 | 4/1995 | McCallum, III et al. | 385/109 |
| 5,422,973 | 6/1995 | Perguson et al. | 385/112 |
| 5,561,729 | 10/1996 | Parris | 385/113 |
| 5,561,730 | 10/1996 | Lochkovic et al. | 385/114 |
| 5,566,266 | 10/1996 | Navé et al. | 385/113 |
| 5,748,823 | 5/1998 | Navé | 385/113 |
| 6,014,487 | 1/2000 | Field et al. | 385/110 |

*Primary Examiner*—John D. Lee
*Assistant Examiner*—Juliana K. Kang
*Attorney, Agent, or Firm*—Ware, Fressola, Van Der Sluys & Adolphson LLP

[57] ABSTRACT

The present invention provides an optical fiber cable having optical fibers, a buffer tube, an outer protective jacket and at least one layer of flexible strength members made of adhesive and non-adhesive yarns. The buffer tube encloses and protects the optical fibers. The at least one layer of flexible strength members made of adhesive and non-adhesive yarns adhesively connects the buffer tube to the outer protective jacket. The adhesive yarn may include a hot-melt adhesive. The at least one layer may include a single layer of three adhesive yarns and six non-adhesive yarns, arranged so that each pair of adhesive yarns has two non-adhesive yarns therebetween. The at least one layer may also include a dual layer of adhesive and non-adhesive yarns, having an inner layer of non-adhesive yarns, and an outer layer of three adhesive yarns and four non-adhesive yarns, arranged so that each pair of adhesive yarns has at least one non-adhesive yarn therebetween.

13 Claims, 7 Drawing Sheets

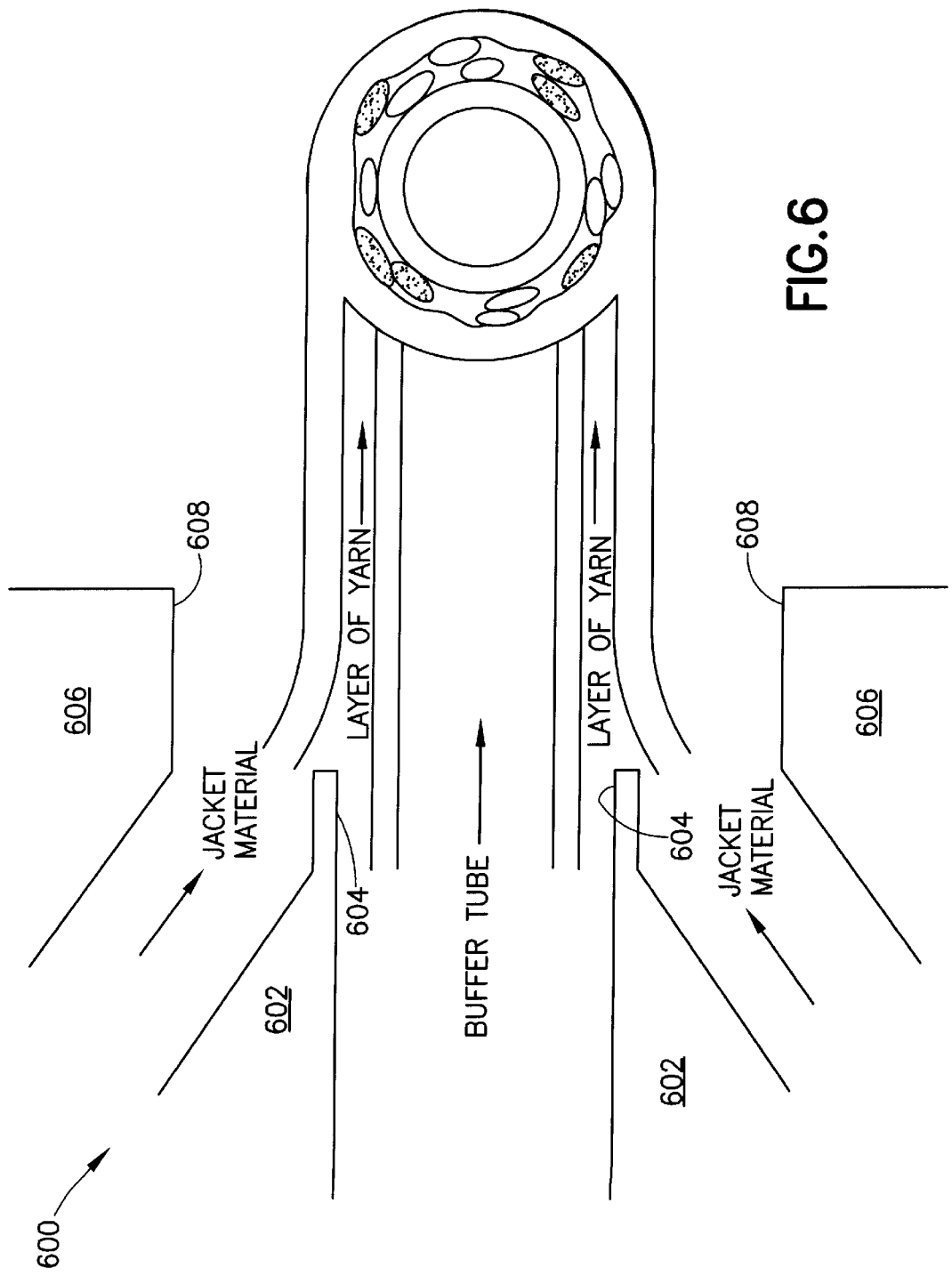

| # 0 | RAW MAT NO. | DESCRIPTION | WALL THKNS INCHES | ID INCHES | NOM OO INCHES | OO +/- |
|---|---|---|---|---|---|---|
| 1 | 01R00<br><br>1210X | FIBER: ALCATEL SMF.ATTEN:1310/1550<br>FIBER TEMPLATE:<br>COLOR: COLORLOCK<br>BL,OR,GR,BR,SL,WH,RD,BK,YI,VI,RS,AQ.-4 BUNDLES<br>48 FIBER CONSTRUCTION | 0.40/0.30<br>3R37 | | | |
| 2 | 2002<br><br>630X | EXTRUDE 1 BUFFER TUBE    12.FIBERS/BUNDLE<br>EXXON ABM2<br>COLOR: NATURAL<br>FIBER BINDER COLORS: BL,OR,GR,BR.<br>FIBER BINDER LAYLENGTH: 3.5" +/ -1.0"<br>FILL WITH MASTERGEL.<br>NOM,MAX,MIN-(WALL-0.035,0.040,0.030)<br>NON,CIRI: 0.020"  MIN.WALL.SPOT 0.020" | 0.0350 | 0.170 | 0.240 | 0.010 |
| 3 | 11103<br><br>11105<br><br>11103<br><br>11105<br><br><br><br>3002 | SINGLE PASS JACKET<br>SPIN 3 LFE 375 "STIFF" & 2 LFE 375 WS<br>(FIRST LAYER)<br>NOTE: LOCATE WATER SWELLABLES 180 DEGREES<br>APART<br>LAY: 8.7"+/-0.5"<br>SPIN 3 LFE 375 "STIFF" & 4 LFE 375 WS<br>(SECOND LAYER)<br>NOTE: LOCATE WATER SWELLABLES 90 DEGREES<br>APART<br>LAY: 8.7"+/-0.5"<br>2-1680 DTEXT WB RIPCORD<br>NOTE PLACE RIPCORDS 180 DEGREES APART<br>JACKET MDPE BLACK<br>(WALL: 0.070+/-0.009) | 0.019<br><br><br><br><br><br>0.019<br><br><br><br><br><br><br>0.070 | <br><br><br><br><br><br><br><br><br><br><br><br><br><br>MIN WALL | 0.278<br><br><br><br><br><br>0.316<br><br><br><br><br><br><br>0.456<br>0.049 | |

FIG.7

| #0 | RAW MAT NO. | DESCRIPTION | WALL THKNS INCHES | ID INCHES | NOM OO INCHES | OO +/- |
|---|---|---|---|---|---|---|
| 1 | 01R00 | FIBER: ALCATEL SMF.ATTEN:1310/1550 | 0.40/0.30 MAX | | | |
| | 121XX | FIBER TEMPLATE:<br>COLOR: COLORLOCK<br>BL,OR,GR,BR,SL,WH,RD,BLK,YI,VT,RS,AQ.-8 BUNDLES<br>96 FIBER LOCATION | 3R37 | | | |
| 2 | 630X | EXTRUDE 1 BUFFER TUBE    12.FIBERS/BUNDLE<br>EXXON ABM2 MATERIAL<br>COLOR: NATURAL<br>FIBER BINDER COLORS: BL,OR,GR,BR,SI,WH,RD,BK<br>FIBER BINDER LAYLENGTH: 3.5" +/ -1.0"<br>FILL WITH MASTERGEI.<br>NOM,MAX,MIN-(WALL-0.035,0.040,0.030) EFL-0.15%<br>NON,CIRI:0.020" MTN WALL SPOT 0.020" | 0.035 | 0.240 | 0.310 | 0.010 |
| 3 | 11103 | SINGLE PASS JACKET<br>SPIN 5 STRANDS LFE 375 "STIFF" & 2 STRANDS<br>OF LFE 375 WS    (FIRST SPINNER) | 0.020 | | 0.350 | |
| | 11105 | NOTE: LOCATE WATER SWELLABLES 180 DEGREES<br>APART<br>LAY: 8.7"+/-0.5" | | | | |
| | 11103 | SPIN 6 STRANDS LFE 375 "STIFF" & 4 STRANDS<br>OF LFE 375 WS    (SECOND SPINNER) | 0.02 | | 0.300 | |
| | 11106 | NOTE: LOCATE WATER SWELLABLES 90 DEGREES<br>APART<br>LAY: 8.7"+/-0.5"<br>2-1680 DTEX WATER BLOCKING RIPCORD<br>NOTE: PLACE RIPCORDS 180 DEGREES APART | | | | |
| | 3002 | JACKET MDPE BLACK<br>(WALL: 0.070"+/-0.009") | 0.070 | | 0.530 | |
| | | | | MIN WALL SPOT | 0.049 | |

FIG.8

| CABLE No | WATER SWELLABLE | | RESTRICTS OR CONTROLS CABLE SHRINKAGE SUFFICIENTLY FOR NO ATTENUATION CHANGE AT −40°C | ALLOWS CABLE ACCESS |
|---|---|---|---|---|
| | WS 375s 1st LAYER | WS 375s 2nd LAYER | | |
| 1 | 0 | 4 | NO | YES |
| 2 | 4 | 0 | NO | YES |
| 3 | 4 | 4 | YES | NO |
| 4 | 2 | 4 | YES | YES |

FIG.9

CABLE HAVING AT LEAST ONE LAYER OF FLEXIBLE STRENGTH MEMBERS WITH ADHESIVE AND NON-ADHESIVE YARNS FOR COUPLING AN OUTER PROTECTIVE JACKET AND A BUFFER TUBE CONTAINING OPTICAL FIBERS

RELATED APPLICATION

This application claims benefit to a provisional patent application having Ser. No. 60/058,751, filed Sep. 12, 1997, as well as a provisional patent application having Ser. No. 60/066,676, filed Nov. 13, 1997, both hereby incorporated by reference.

BACKGROUND OF THE INVENTION

1. Technical Field

This invention relates to an optical fiber cable; and more particularly relates to an optical fiber cable having a buffer tube.

2. Description of Prior Art

Optical fiber cables having flexible strength members are known in the art. Siecor makes a cable having contra-helically wound flexible strength members arranged between, but not coupling, a buffer tube and an outer protective jacket. In order to meet cold temperature requirements, Siecor's cable requires a pressure extruded jacket and a contra-helically winding, which complicates and increases the cost of the cable manufacturing process, because (1) expensive spinners are needed (2) the line speed is limited due to the maximum spinner RPMs and (3) the process must be stopped for yarn changes.

Other cables are known in the prior art. U.S. Pat. No. 4,892,382 teaches a cable having inner fiber yarn material and polyurethane fiber glass arranged between an inner buffer tube and an outer protective tube. U.S. Pat. No. 5,561,729 shows and describes a cable having tensile strength aramid yarn, water absorbent material, tape and antibuckling members arranged between an inner buffer tube and an outer protective jacket. U.S. Pat. No. 4,892,382 shows and describes a cable having tensile strength members, water absorbent material, tape, and impregnated yarn antibuckling members arranged between an inner buffer tube and an outer protective jacket. These composite cables suffer from one or more problems such as not providing easy access to the optical fibers, or not meeting the cold temperature requirement.

However, a technical problem remains unsolved in the prior art, i.e. to couple an outer protective jacket and an inner tube to meet cold temperature requirements in the cable industry, i.e. to minimize cable shrinkage at −40 degrees Celsius that causes undesirable signal attenuation in the optical fiber, while enabling manual separation to gain service access to the optical fibers inside the inner buffer tube.

SUMMARY OF THE INVENTION

The present invention provides an optical fiber cable having optical fibers, a buffer tube, an outer protective jacket and at least one layer of flexible strength members made of adhesive and non-adhesive yarns.

The buffer tube encloses and protects the optical fibers. The at least one layer of flexible strength members made of adhesive and non-adhesive yarns adhesively connects the buffer tube to the outer protective jacket.

The adhesive and non-adhesive yarns includes a hot-melt adhesive, or low melt temperature plastic, which when heated becomes tacky and adheres to adjacent layers in the heating and cooling process.

In one embodiment, the optical fiber cable has a single layer of three adhesive yarns and six non-adhesive yarns arranged so that each pair of adhesive yarns has two non-adhesive yarns therebetween. The single layer may be laid longitudinally (i.e. straight) on the buffer tube, or may be wound helically or contra-helically about the buffer tube.

The adhesive yarn may be water-swellable yarn having adhesive properties when heated and is available from a company named NEPTCO Incorporated. Water-swellable non-adhesive yarn is available from a company named Owens-Corning.

In other embodiments, the optical fiber cable has a dual layer of flexible strength members made of adhesive and non-adhesive yarns that may be either laid straight on the buffer tube, or wound helically or contra-helically about the buffer tube. The dual layer includes an inner helically wound layer of yarn with at least two diametrically-opposed water-swellable adhesive yarns and water-swellable non-adhesive yarns arranged in between, and also includes an outer contra-helically wound layer of yarn with at least two symmetrically-arranged water-swellable adhesive yarns and water-swellable non-adhesive yarns arranged in between.

One advantage of the present invention is that the layer of flexible strength member made of adhesive and non-adhesive yarn forms a unique adhesive bond between the outer protective jacket and the inner buffer tube that is much easier to manufacture, that is strong enough to enable the composite cable to meet cold temperature requirements in the cable industry, that enables the inner buffer tube to be separated from the outer protective jacket to permit service access to the optical fibers within the buffer tube, that allows a wide range of materials to be incorporated into the cable design, and that increases the manufacturing processing window or reduces the precision of the process tension control.

A DESCRIPTION OF THE DRAWING

For a fuller understanding of the nature of the invention, reference should be made to the following detailed descriptions taken in connection with the accompanying drawings, not in scale, in which:

FIG. 6 is a diagram of a tip/die combination used in the jacket extrusion step of the flowchart of the manufacturing process shown in FIG. 5.

FIG. 7 is a specification sheet for a cable design for an optical fiber cable that is the subject matter of the present invention.

FIG. 8 is a specification sheet for a cable design for an optical fiber cable that is the subject matter of the present invention.

FIG. 9 is a table of test results for various cable designs.

BEST MODE FOR CARRYING OUT THE INVENTION

Figure 1:
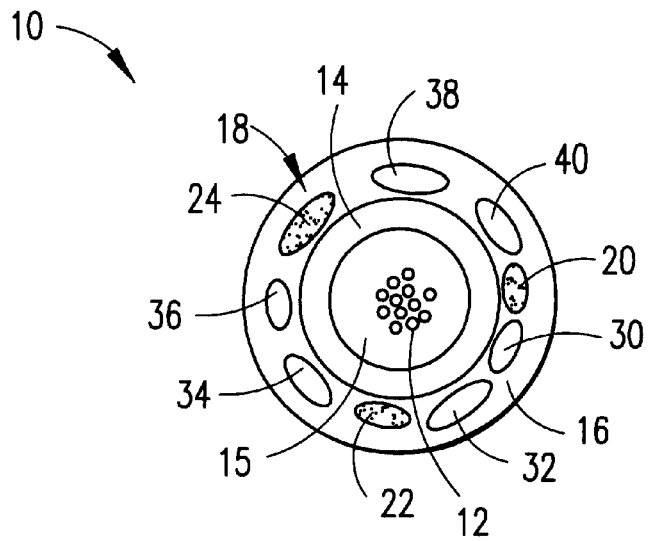
FIG. 1 is a diagram of one embodiment of an optical fiber cable that is the subject matter of the present invention.

FIG. 1—Optical Fiber Cable 10

FIG. 1 shows an optical fiber cable generally indicated as 10. The optical fiber cable 10 has optical fibers 12, a buffer tube 14, a tube fill material 15, an outer protective jacket 16 and at least one layer of flexible strength members made of adhesive and non-adhesive yarns generally indicated as 18.

The buffer tube 14 encloses and protects the optical fibers 12. The buffer tube 14 may be made from a thermoplastic such as polypropylene, although the scope of the invention is not intended to be limited to any particular type of buffer tube material. The buffer tube 14 may also have the tube fill material 15 therein to absorb undesirable water and moisture therein, including water-swellable powder, gel, etc.

The at least one layer 18 of flexible strength members made of adhesive and non-adhesive yarns is made of one or more adhesive yarns 20, 22, 24 and one or more non-adhesive yarns 30, 32, 34, 36, 38, 40 for adhesively connecting the buffer tube 14 to the outer protective jacket 16. The outer protective jacket 16 may be made from a thermoplastic such as polyethylene, although the scope of the invention is not intended to be limited to any particular type of jacket material. The outer protective jacket 16 may also include flame retardant fillers or smoke inhibiting fillers.

In FIG. 1, the at least one layer 18 is a single layer having three adhesive yarns 20, 22, 24 and six non-adhesive yarns 30, 32, 34, 36, 38, 40. Each adhesive yarn 20, 22, 24 is circumferentially arranged about the buffer tube 14 at about 60 degrees and is respectively separated by two non-adhesive yarns 30, 32; 34, 36; 38, 40. The scope of the invention is not intended to be limited to any particular number of adhesive and non-adhesive yarns, or any particular circumferential arrangement thereof about the buffer tube 14.

The non-adhesive yarns 30, 32, 34, 36, 38, 40 are each a fiber glass yarn that is known in the art and made by a company named Owens-Corning with a product name of a 375 stiff, and soon may also be available from NEPTCO Incorporated.

The adhesive yarns 20, 22, 24 are each a fiber glass yarn that is known in the art and also made by NEPTCO Incorporated with a product name of a WB-375. The adhesive yarn may also include a hot-melt adhesive, or low melt temperature plastic, which when heated becomes tacky and adheres to adjacent layers in the heating and cooling process.

In operation, the unique combination of adhesive yarns 20, 22, 24 and non-adhesive yarns 30, 32, 34, 36, 38, 40 couples the outer protective jacket 16 and the inner buffer tube 14 to meet cold temperature requirements in the cable industry, i.e. to minimize cable shrinkage at −40 degrees Celsius that causes undesirable signal attenuation in the optical fiber, while enabling manual separation to gain service access to the optical fibers inside the inner buffer tube.

The scope of the invention is not intended to be limited to any particular strength member or yarn, any particular adhesive yarn, any particular non-adhesive yarn, any particular fiber glass yarn, or any particular yarn from any particular company. Embodiments are envisioned using either another strength member or yarn other than that described herein, another adhesive yarn other than that described herein, another non-adhesive yarn other than that described herein, another fiber glass yarn other than that described herein, another yarn from another company other than that described herein, or any combination thereof.

The manufacturing of the optical fiber cable 10 is discussed in more detail below. In general, the unique combination of adhesive yarns 20, 22, 24 and non-adhesive yarns 30, 32, 34, 36, 38, 40 are applied to the buffer tube 14 in a manner known in the art, including but limited to being laid longitudinal (i.e. straight on the buffer tube 14, or wound helically or contra-helically about the buffer tube 14, or wound in an overlapping manner about the buffer tube 14, or a combination thereof. The scope of the invention is not intended to be limited to any particular application, winding or lay length of the yarn with respect to the buffer tube. The outer protective jacket 16 is extruded over the adhesive yarns 20, 22, 24 and non-adhesive yarns 30, 32, 34, 36, 38, 40, and allowed to harden so the combination of adhesive yarns 20, 22, 24 and non-adhesive yarns 30, 32, 34, 36, 38, 40 adhere the outer protective jacket 16 to the buffer tube 14.

One significant advantage of the invention is that it meets the cold temperature requirements in the industry and the outer protective jacket 16 and the at least one layer 18 of adhesive and non-adhesive yarns is easily pulled away from the buffer tube 14 to gain access to the bundle of optical fibers 12.

Figure 2:
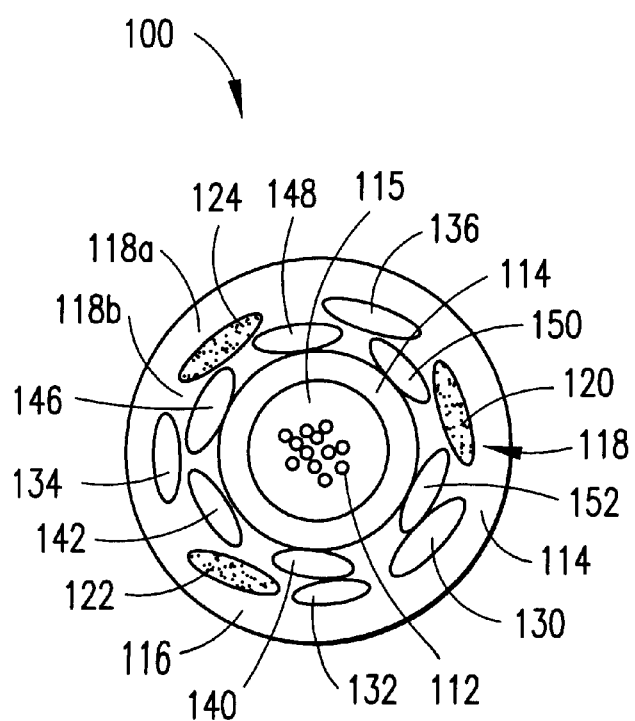
FIG. 2 is a diagram of another optical fiber cable that is the subject matter of the present invention.
Figure 3:
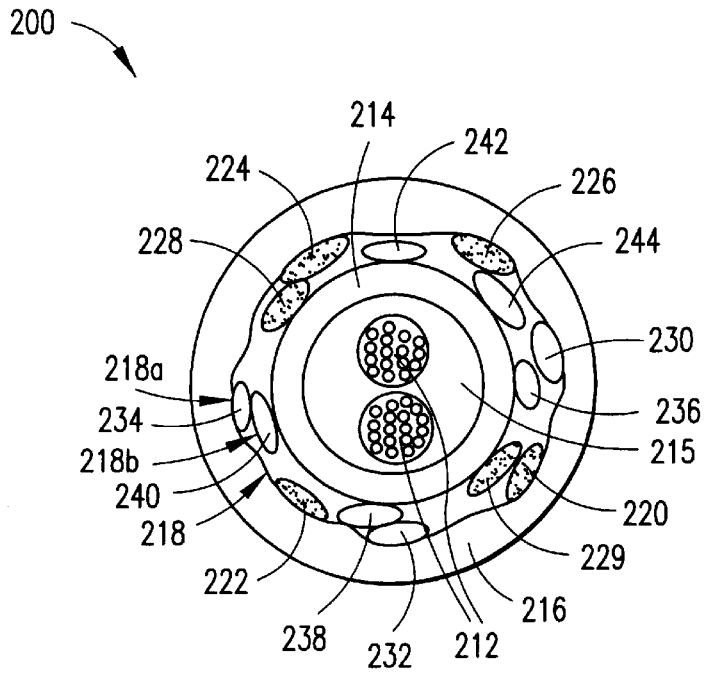
FIG. 3 is a diagram of another optical fiber cable that is the subject matter of the present invention.
Figure 4:
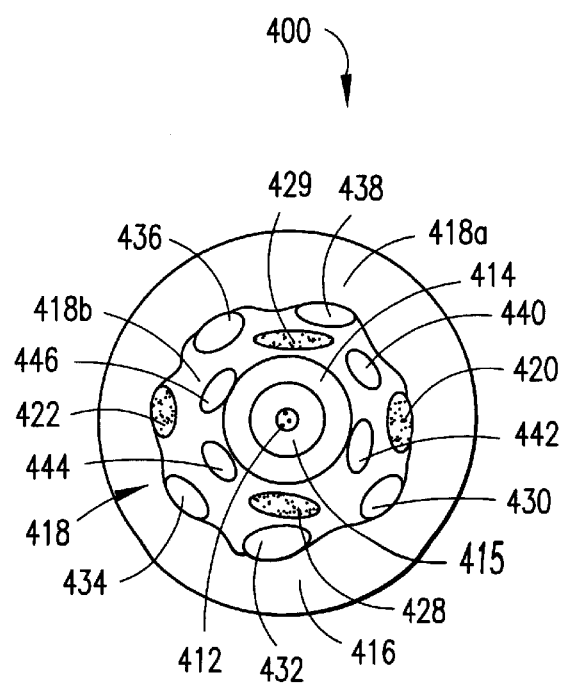
FIG. 4 is a diagram of another optical fiber cable that is the subject matter of the present invention.

FIGS. 2–4—Optical Fiber Cables 100, 200, 300

FIG. 2 shows an optical fiber cable generally indicated as 100. The optical fiber cable 100 has optical fibers 112, a buffer tube 114, a tube fill material 115, an outer protective jacket 116 and at least one layer of flexible strength members made of adhesive and non-adhesive yarns generally indicated as 118.

In the optical fiber cable 100, the at least one layer 118 is a dual layer having an outer layer generally indicated as 118a and an inner layer generally indicated as 118b. The outer layer 118a has three adhesive yarns 120, 122, 124 and four non-adhesive yarns 130, 132, 134, 136 arranged so that each pair of adhesive yarns 120, 122, 124 has at least one non-adhesive yarn 130, 132, 134, 136 therebetween. The inner layer 118b has non-adhesive yarns 140, 142, 146, 148, 150, 152.

The dual layer 118 of adhesive and non-adhesive yarns 130, 132, 134, 136, 140, 142, 146, 148, 150, 152 may be contra-helically wound, including the inner layer 118b being a helically wound layer and the outer layer 118a being a contra-helically wound layer.

The buffer tube 114, the tube fill material 115, the outer protective jacket 116 and adhesive and non-adhesive yarns 130, 132, 134, 136, 140, 142, 146, 148, 150, 152 are similar to that discussed above with respect to FIG. 1, as well as the manufacturing of the optical fiber cable 100.

FIG. 3 shows an optical fiber cable generally indicated as 200. The optical fiber cable 200 has optical fibers 212, a buffer tube 214, a tube fill material 215, an outer protective jacket 216 and at least one layer of flexible strength members made of adhesive and non-adhesive yarns generally indicated as 218.

The at least one layer 218 is a dual layer of flexible strength members made of adhesive and non-adhesive yarns, which includes an outer layer 218a and an inner layer 218b. The outer layer 218a includes four adhesive yarns 220, 222, 224, 226 and three non-adhesive yarns 230, 232, 234. The adhesive yarns 220, 222 are separated by the non-adhesive yarn 232; the adhesive yarns 222, 224 are separated by the non-adhesive yarn 234; the adhesive yarns 226, 220 are separated by the non-adhesive yarn 230. The inner layer 218b includes two adhesive yarns 228, 229 and five non-adhesive yarns 236, 238, 240, 242, 244. As shown, the two adhesive yarns 228, 229 are arranged diametrically opposed to one another, and respectively separated by non-adhesive yarns 238, 240; and 242, 244, 236.

The outer layer 218a is contra-helically wound about the inner layer 218a, and the inner layer 118b may be helically wound about the buffer tube 214, although the scope of the invention is not intended to be limited to any particular winding application.

The buffer tube 214, the tube fill material 215, the outer protective jacket 216 and adhesive and non-adhesive yarns 220, 222, 224, 226, 228, 229, 230, 232, 234, 236, 238, 240, 242, 244 are similar to that discussed above with respect to FIG. 1, as well as the manufacturing of the optical fiber cable 200.

In one embodiment tested, the adhesive yarns 220, 222, 224, 226, 228, 229 were NEPTCO WB-375 with dimensions of about 2.19 millimeters by 0.85 millimeters, and the non-adhesive yarns 230, 232, 234, 236, 238, 240, 242, 244 were WB-375 stiff with dimensions of about 2.13 millimeters by 0.66 millimeters. The outer protective jacket 216 was made of polyethylene with a thickness of 0.070 millimeters. The buffer tube 214 was made of polypropylene with a thickness in a range of 0.170–0.230 or 0.240–0.310.

FIG. 4 shows an optical fiber cable generally indicated as 400. The optical fiber cable 40 has optical fibers 412, a buffer tube 414, a tube fill material 415, an outer protective jacket 416 and at least one layer of flexible strength members made of adhesive and non-adhesive yarns generally indicated as 418.

The at least one layer 418 is a dual layer, which includes an outer layer 418a and an inner layer 418b. The outer layer 418a includes two adhesive yarns 420, 422 and five non-adhesive yarns 430, 432, 434, 436, 438. The adhesive yarns 420, 422 are diametrically opposed and are respectively separated by the non-adhesive yarns 430, 432, 434 and 436, 438. The inner layer 418b includes two adhesive yarns 428, 429 and four non-adhesive yarns 440, 442, 444, 446. The two adhesive yarns 428, 429 are also arranged diametrically opposed to one another, and respectively separated by non-adhesive yarns 440, 442 and 444, 446.

FIG. 9 shows a table that summarizes some results of preliminary tests arranged by cables No., WB-375 per first layer (i.e. inner), WB-375 per second layer (i.e. outer), restriction or control, and cable access ("yes" means sufficiently accessible using a field knife and by manually pulling apart, while "No" means not accessible). The cable access requirement is an objective standard in the industry and not yet formally quantized. The table shows that the total number of WB-375 adhesive yarns and 375 stiff non-adhesive yarns per layer depends on the cable and buffer tube size, and falls in a range of 7–10.

It has been found through testing that, for a buffer tube having a thickness of 0.240 millimeters, the total number of WB-375 adhesive yarns and 375 stiff non-adhesive yarns per layer is seven, and includes a first layer having two WB-375 adhesive yarns and five 375 stiff non-adhesive yarns, and a second layer having four WB-375 adhesive yarns and three 375 stiff non-adhesive yarns. In comparison, for a buffer tube having a thickness of 0.310 millimeters, the total number of WB-375 adhesive yarns and 375 stiff non-adhesive yarns per layer is ten, and includes a first layer having two WB-375 adhesive yarns and eight 375 stiff non-adhesive yarns and a second layer having four WB-375 adhesive yarns and six 375 stiff non-adhesive yarns.

Embodiments are also envisioned having an inner layer having two WB-375 adhesive yarns arranged 180 degrees apart and 375 stiff non-adhesive yarns in a range of 5–8 together with an outer layer having four WB-375 adhesive yarns arranged 90 degrees apart and 375 stiff non-adhesive yarns in a range of 3–6. It has generally been found that if a total quantity of WB-375 adhesive yarns is greater than two and less than six, then the total cable shrinkage leads to optimal attenuation of the optical fiber therein, while allowing easy cable disassembly.

Figure 5:
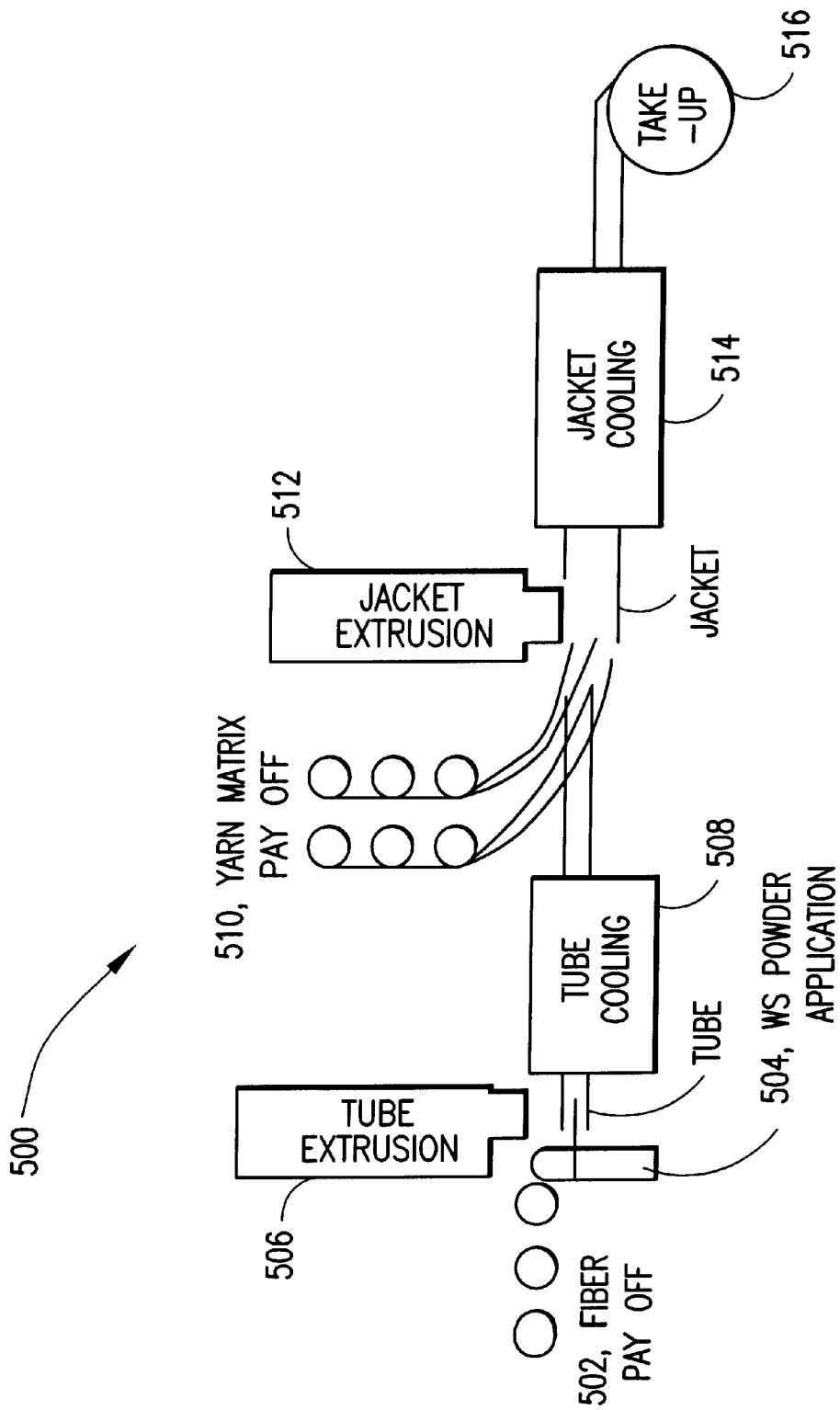
FIG. 5 is a diagrammatic flowchart of a manufacturing process for making the optical fiber cable shown in FIGS. 1–4.

FIG. 5—The Manufacturing Process

FIG. 5 shows a diagrammatic flowchart of the steps in a longitudinal manufacturing process generally indicated as 500 of the cables shown in FIGS. 1–4.

The manufacturing process includes at least the following steps: a fiber payoff step 502, a water powder application step 504, a tube extrusion step 506, a buffer tube cooling step 508, a yarn matrix payoff step 510, a jacket extrusion step 512, a jacket cooling step 514 and a take-up step 516. The yarn matrix payoff step 510 pays off yarn from two spools including both adhesive yarn and non-adhesive yarn. The use of a longitudinal fiberglass strands tandemized process allows strand tie-in and longer production runs.

The Manufacturing Tip and Die Combination

FIG. 6 shows a tip and die combination generally indicated as 600 used in the jacket extrusion step 512 of the manufacturing process shown in FIG. 5 for extruding the outer protective jacket 16, 116, 216, 416 about the at least one layer of flexible strength members made of adhesive and non-adhesive yarns 18, 118, 218, 418 show in FIGS. 1–4.

The tip and die combination includes a tip 602 having a land 604, as well as a die 606 having a land 608. Through experimentation it has been found that if the die land dimension is less than 0.040 millimeters, then the outer protective jacket 16, 116, 216, 416 is too loose, and if the die land dimension is greater than 0.120 millimeters, then the outer protective jacket 16, 116, 216, 416 is too adhesive and completely submerges into the at least one layer of flexible strength members made of adhesive and non-adhesive yarns 18, 118, 218, 418 causing bad access characteristics. As shown, the die land 608 is preferably 0.080 inches. In the cable design of the present invention, the polyethylene should not be extruded so as to submerge completely into the inner layer of the wound layers.

FIGS. 7 and 8—Specification Sheets for Cable Designs

FIGS. 7 and 8 show specification sheets for other cable designs, including cable no., raw material, a description, a wall thickness, an inner diameter, and an outer diameter, which would enable a person skilled in the art to make cables without undue experimentation.

Discussion Relating to Provisional Patent Application

The provisional patent application having Ser. No. 60/058,751 has been incorporated into this patent application by reference above in its entirety.

FIGS. 1–2, 4–5 and 7 of the provisional patent application have been substantially included in their entirety in the description of the present invention in the instant patent application.

However, FIGS. 3 and 6–10 of the provisional patent application have been omitted in whole or in part. FIG. 3 of the provisional patent application relates to possible claims envisioned by the inventor. FIG. 6 of the provisional patent application relates to a cable design flowchart showing the various mental steps carried out in a cable design, which is believed to be generally known to a person skilled in the cable design art. FIG. 7 of the provisional patent application relates to a calculation of a cable contraction coefficient referred to in step A of FIG. 6 of the provisional patent application, and the calculation of which is believed to be generally known to a person skilled in the cable design art. FIGS. 8–9 of the provisional patent application relates to a calculation of overall stiffness requirements for a cable design referred to in step B of FIG. 6 of the provisional patent application, and the calculation of which is believed to be generally known to a person skilled in the cable design art. FIG. 10 of the provisional patent application relates to a calculation of quantity of yarn for a cable design meeting the Bellcore 6R-20 specification for step C of FIG. 6 of the provisional patent application, and the calculation of which is believed to be generally known to a person skilled in the cable design art. The reader is referred to the provisional patent application to review the contents of FIGS. 3 and 6–10 and a description thereof.

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the invention is intended to be claimed in a regular utility application to cover all of the generic and specific features of the invention herein described and all statements of the scope of the invention which, as a matter of language, might be said to fall therebetween.

What is claimed is:

1. An optical fiber cable comprising:
   optical fibers;
   a buffer tube for enclosing the optical fibers;
   an outer protective jacket; and
   at least one layer of flexible strength members made of adhesive and non-adhesive yarns for adhesively connecting the buffer tube to the outer protective jacket.

2. The optical fiber cable according to claim 1, wherein the adhesive and non-adhesive yarns includes a hot-melt adhesive, or low melt temperature plastic, which when heated becomes tacky and adheres to adjacent layers in the heating and cooling process.

3. The optical fiber cable according to claim 1, wherein the at least one layer of flexible strength members made of adhesive and non-adhesive yarns is a single layer of three adhesive yarns and six non-adhesive yarns arranged so that each pair of adhesive yarns has two non-adhesive yarns therebetween.

4. The optical fiber cable according to claim 1, wherein the at least one layer of flexible strength members made of adhesive and non-adhesive yarns is a dual layer of adhesive and non-adhesive yarns, having an inner layer of non-adhesive yarns, and an outer layer of three adhesive yarns and four non-adhesive yarns, arranged so that each pair of adhesive yarns has at least one non-adhesive yarn therebetween.

5. The optical fiber cable according to claim 1, wherein the at least one layer is a dual layer of adhesive and non-adhesive yarns that are contra-helically wound, that have an inner helically wound layer of yarn with at least two diametrically-opposed water-swellable adhesive yarns and water-swellable non-adhesive yarns arranged in between, and that also have an outer contra-helically wound layer of yarn with at least two symmetrically-arranged water-swellable adhesive yarns and one or more water-swellable non-adhesive yarns arranged in between.

6. The optical fiber cable according to claim 1,
   wherein the at least one layer of flexible strength members made of adhesive and non-adhesive yarns includes having an inner and an outer layer,
   wherein the outer layer has a mixture of yarns with a minimum of two adhesive yarns that results in reduced cold temperature cable contraction and improved crush performance.

7. The optical fiber cable according to claim 1, wherein the at least one layer of flexible strength members made of adhesive and non-adhesive yarns includes a maximum of six adhesive yarns that allows for acceptable disassembly in the field.

8. The optical fiber cable according to claim 1,
   wherein the at least one layer of flexible strength members made of adhesive and non-adhesive yarns is a dual layer of adhesive and non-adhesive yarns;
   wherein the dual layer has an inner layer of non-adhesive yarns of two adhesive yarns and four non-adhesive yarns arranged so that the two adhesive yarns have at least one non-adhesive yarn therebetween; and
   wherein the dual layer has an outer layer of two adhesive yarns and five non-adhesive yarns arranged so that the adhesive yarns have at least one non-adhesive yarn therebetween.

9. The optical fiber cable according to claim 1,
   wherein the at least one layer of flexible strength members made of adhesive and non-adhesive yarns are wound on the buffer tube either helically, contra-helically, or a combination thereof.

10. An optical fiber cable comprising:
    optical fibers;
    a buffer tube for enclosing the optical fibers;
    an outer protective jacket; and
    at least one layer of adhesive and non-adhesive flexible strength members for adhesively connecting the buffer tube to the outer protective jacket.

11. The optical fiber cable according to claim 10,
    wherein the at least one layer of adhesive and non-adhesive flexible strength members are made of adhesive and non-adhesive yarns.

12. The optical fiber cable according to claim 10, wherein the at least one layer of adhesive and non-adhesive flexible strength members are a single layer of adhesive and non-adhesive yarns.

13. The optical fiber cable according to claim 10, wherein the at least one layer of adhesive and non-adhesive flexible strength members are a dual layer of adhesive and non-adhesive yarns, including an inner layer of adhesive and non-adhesive yarns and an outer layer of adhesive and non-adhesive yarns.

\* \* \* \* \*